United States Patent
Yuan et al.

(12)

(10) Patent No.: US 12,514,501 B2
(45) Date of Patent: Jan. 6, 2026

(54) WEARABLE PHYSIOLOGICAL MEASUREMENT APPARATUS

(71) Applicants: Hangzhou Megasens Technology Co., Ltd., Hangzhou (CN); Singapore Medsense Technology Pte. Ltd., Singapore (SG)

(72) Inventors: Haiquan Yuan, Hangzhou (CN); Xiaobo Zeng, Hangzhou (CN); Jianjun Wang, Hangzhou (CN); Jun Hu, Hangzhou (CN); Congcong Zhou, Hangzhou (CN); Wei Lin, Hangzhou (CN)

(73) Assignees: Hangzhou Megasens Technology Co., Ltd., Hanzhou (CN); Singapore Medsense Technology Pte. Ltd., Singapore (SG)

( * ) Notice: Subject to any disclaimer, the term of this patent is extended or adjusted under 35 U.S.C. 154(b) by 411 days.

(21) Appl. No.: 18/327,130

(22) Filed: Jun. 1, 2023

(65) Prior Publication Data

US 2024/0090836 A1    Mar. 21, 2024

(30) Foreign Application Priority Data

Sep. 21, 2022 (CN) .......................... 202222497349.3

(51) Int. Cl.
*A61B 5/00* (2006.01)
*A61B 5/1455* (2006.01)

(52) U.S. Cl.
CPC ........ *A61B 5/6826* (2013.01); *A61B 5/14552* (2013.01)

(58) Field of Classification Search
CPC . A61B 5/0205; A61B 5/02108; A61B 5/1455; A61B 5/14551; A61B 5/14552; A61B 5/68; A61B 5/681; A61B 5/6801; A61B 5/6813; A61B 5/6822; A61B 5/6823; A61B 5/6825; A61B 5/6828; A61B 5/6826; A61B 5/6843; A44C 9/02
See application file for complete search history.

(56) References Cited

U.S. PATENT DOCUMENTS 3,423,956 A * 1/1969 Manne ................. A44C 9/0046
63/15.65
7,013,674 B2 * 3/2006 Kretchmer ............... A44C 9/02
63/15.7

(Continued)

FOREIGN PATENT DOCUMENTS

CN      110251095 A    9/2019
JP      2009183413 A    8/2009

*Primary Examiner* — Chu Chuan Liu
(74) *Attorney, Agent, or Firm* — BakerHostetler

(57) ABSTRACT

A wearable physiological measurement apparatus comprises a base, a bridge member, and a first and second support members movably coupled to the base and the bridge member to surround size-variable an opening for accommodating a care giver's finger therein. A measurement device is coupled to the base and with a probe projecting toward the opening for contacting the finger for vital sign measurement and monitoring. Resilient members are coupled between the base, the bridge member and the first and second support members to bias the base, the bridge member and the first and second support members moving toward each other to grip the finger to maintain proper contact of the probe to the finger.

17 Claims, 8 Drawing Sheets

(56) References Cited

U.S. PATENT DOCUMENTS

| | | | |
|---|---|---|---|
| 9,711,060 B1* | 7/2017 | Lusted | A61B 5/02416 |
| 10,152,082 B2* | 12/2018 | Bailey | G06F 1/1656 |
| 2008/0163646 A1* | 7/2008 | Czajka | A44C 9/02 |
| | | | 63/15.6 |
| 2010/0182126 A1* | 7/2010 | Martis | A61B 5/1172 |
| | | | 340/5.82 |
| 2018/0042513 A1 | 2/2018 | Connor | |
| 2020/0397101 A1 | 12/2020 | Yuan et al. | |
| 2021/0278898 A1 | 9/2021 | Erivantcev et al. | |
| 2022/0256984 A1 | 8/2022 | Min et al. | |

* cited by examiner

WEARABLE PHYSIOLOGICAL MEASUREMENT APPARATUS

CROSS-REFERENCE TO RELATED APPLICATIONS

The present application claims priority to China Patent Application No. 202222497349.3 filed on Sep. 21, 2022, the contents of which is hereby incorporated by reference as if set forth in its entirety herein.

TECHNICAL FIELD

The present application relates to body care apparatus for human beings and more particularly, to a wearable physiological measurement apparatus.

BACKGROUND

Physiological information or vital signs such as blood oxygen saturation level is one of the key clinical physiological parameters in assessing the physiological and health status of human beings. Physiological measurement may be carried out by comprehensive measurement systems in hospitals or, in terms of home use, by portable devices such as fingertip pulse oximeter. Typical fingertip pulse oximeter is of the pegs type that clamps the tip of a finger of a care receiver during measurement. While fingertip pulse oximeter is able to perform general measurement of blood oxygen saturation level, fingertip pulse oximeter requires the care receiver to be at resting posture, and is not suitable for continuous monitoring. Over-tight clamping to a fingertip may cause discomfort to the care receiver, and where if the clamping is too loose, the oximeter will tend to drop and in either case, the measurement results may not be accurate. It is therefore desirable to provide a wearable physiological measurement apparatus that is capable of performing blood oxygen saturation level measurement on continuous basis while the care receiver is either at rest or on the go.

SUMMARY

Described therein is a wearable physiological measurement apparatus for vital signs measurement and monitoring for care receivers of various body figures. In one aspect, a wearable physiological measurement apparatus comprises a base, a first support member and a second support member movably coupled to the base. The base has a first base segment, a second base segment angled relative to the first base segment, and a middle portion between the first base segment and the second base segment. The first support member has a first mounting segment and a first holding segment angled with respect to the first mounting segment, and the first mounting segment is telescopically coupled to the first base segment of the base. The second support member has a second mounting segment and a second holding segment angled with respect to and the second mounting segment, and the second mounting segment is telescopically coupled to the second base segment of the base. The base, the first support member and the second support member are arranged along an annular contour to surround an opening. The first holding segment are angled relative to the first mounting segment toward the opening, and the second holding segment being angled relative to the second mounting segment toward the opening. A measurement device is coupled to the middle portion of the base and projecting towards the opening. A battery is disposed in the first support member and electrically connected to the measurement device. The first support member and the second support member are movable relative to the base to vary a dimension of the opening such that the wearable physiological measurement apparatus is capable to be worn by care receivers of various body figures.

BRIEF DESCRIPTION OF DRAWINGS

Features of the embodiments of the present invention will be more comprehensively understood in conjunction with the accompanying drawings, in which.

DETAILED DESCRIPTION

Figure 1:
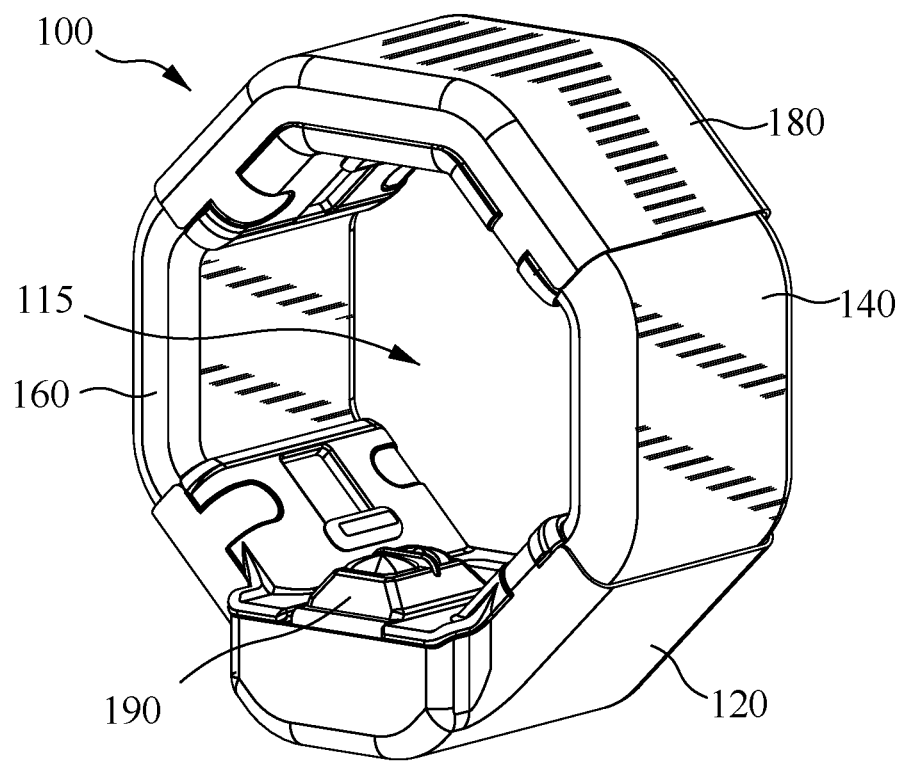
FIG. 1 is a perspective view of a wearable physiological measurement apparatus according to one embodiment.
Figure 2:
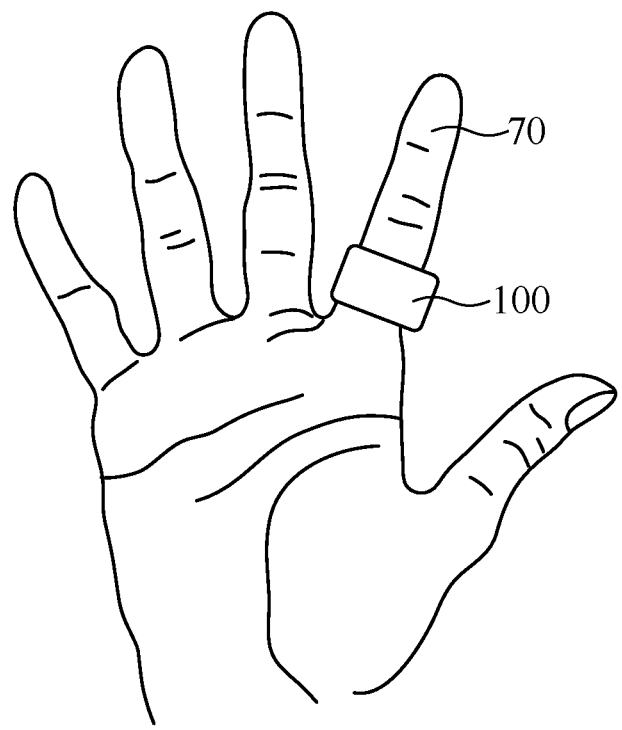
FIG. 2 is a diagram showing an application of the wearable physiological measurement apparatus of FIG. 1.
Figure 3:
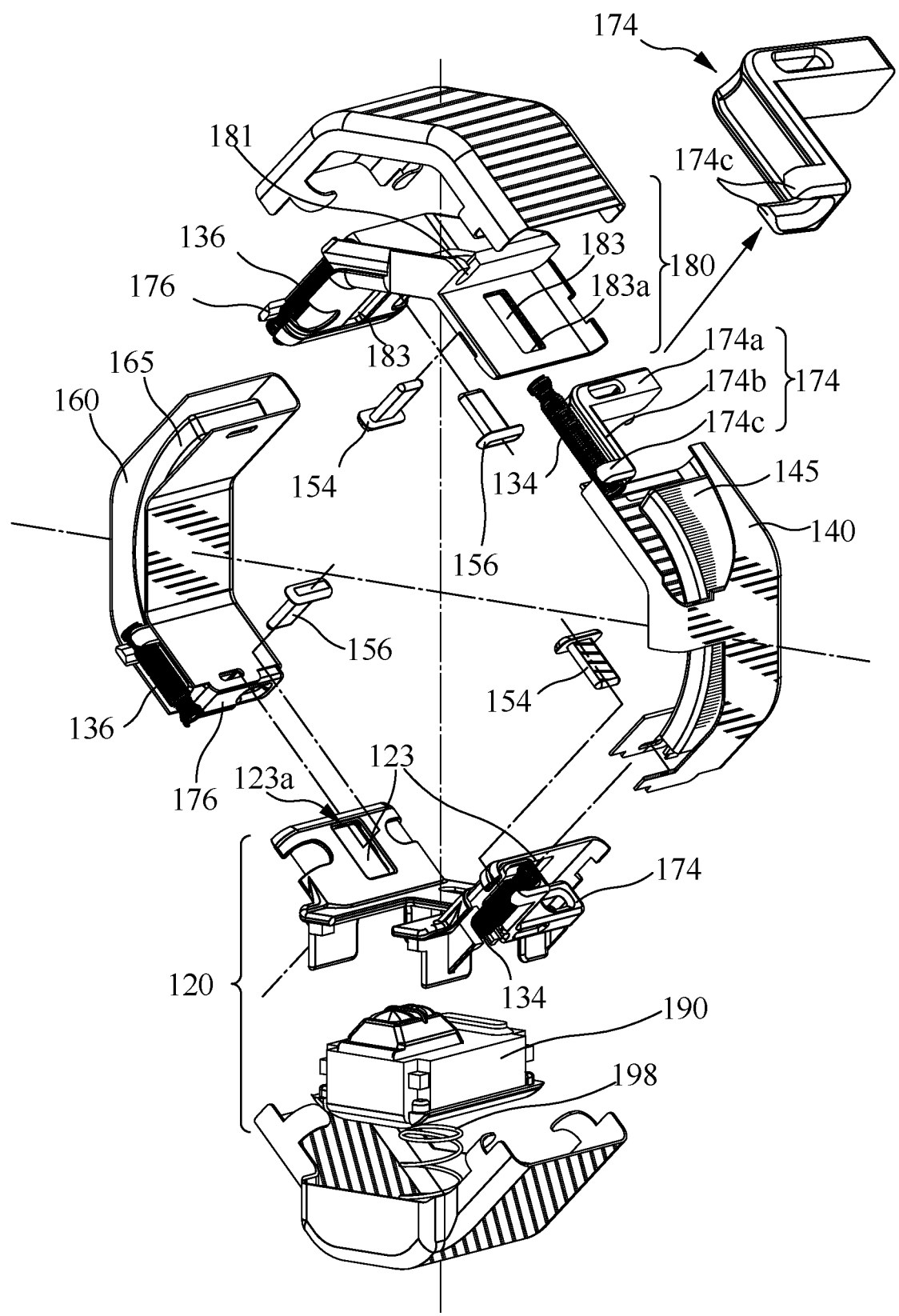
FIG. 3 is an exploded perspective view including a partial enlarged view of FIG. 1.

As shown in FIG. 1 to FIG. 5, the present application provides a wearable physiological measurement apparatus for vital signs measurement and monitoring for care receivers of various body figures. According to one embodiment, a wearable physiological measurement apparatus 100 is configured to be worn on a finger 70 of a care receiver, for vital signs measurement through the finger. The wearable physiological measurement apparatus 100 comprises a base 120, a first support member 140 and a second support member 160 movably coupled to the base 120, a measurement device 190 coupled to the base 120, and one or two batteries 145, 165 electrically connected to the measurement device 190. The base 120 has a first base segment 124, a second base segment 126 opposite to the first base segment 124, and a middle portion 122 between the first base segment 124 and the second base segment 126. The first base segment 124 and the second base segment 126 are angled toward a same direction from the middle portion 122, with an angle between 90-degree and 180-degree, e.g. 135-degree and accordingly, the base 120 is a segment of a convex polygon-shaped frame e.g. in the present embodiment, the base 120 is a segment of a convex octagon-shaped frame with the first base segment 124, the middle portion 122 and the second base segment 126 forming three sides of the octagon-shaped frame.

The first support member 140 and the second support member 160 are structured symmetrical to each other. The first support member 140 has a first mounting segment 142 and a first holding segment 148 angled toward the same side with respect to the first mounting segment 142. The first mounting segment 142 is telescopically coupled to the first base segment 124 of the base 120, by which, the first support member 140 is telescopically coupled to the base 120 such that the first support member 140 is movable relative to the base 120. Likewise, the second support member 160 has a second mounting segment 162 and a second holding segment 168 angled with respect to the second mounting segment 162. The second mounting segment 162 is telescopically coupled to the second base segment 126 of the base 120, by which, the second support member 160 is telescopically coupled to the base 120, such that the second support member 160 is movable relative to the base 120.

The base 120, the first support member 140 and the second support member 160 are arranged along an annular contour 105 to surround an opening 115. The first holding segment 148 is angled relative to the first mounting segment 142 toward the opening 115, and the second holding segment 168 is angled relative to the second mounting segment 168 toward the opening 115.

The measurement device 190 can be one configured for continuous or intermittent measurement and/or monitoring of the degree of oxygen saturation of circulating blood or a localized region of tissue, or other corresponding biomedical information of a care receiver. The measurement device 190 has a housing 192 coupled to the middle portion 122 of the base 120, and a probe 195 projecting from the housing 192 and towards the opening 115.

A first battery 145 is disposed in the first support member 140, and electrically connected to the measurement device 190. Alternatively or additionally, a second battery 165 is disposed in the second support member 160, and electrically connected to the measurement device 190.

With the first support member 140 and second support member 160 telescopically coupled to the base 120, the first support member 140 and second support member 160 become movable relative to the base 120, to vary a dimension of the opening 115. For example, as shown in FIG. 5 to FIG. 8, with the first mounting segment 142 and second mounting segment 162 being at a retracted position 102 relative to the respective first base segment 124 and the second base segment 126 of the base 120, i.e. with the first support member 140, second support member 160 and the base 120 moving toward each other along a retracting direction 103, the opening 115 surrounded by the base 120, the first support member 140 and the second support member 160 is formed of a first cross sectional dimension D11, for receiving a care receiver's finger of a relatively smaller size P11 in cross section. With the first mounting segment 142 and second mounting segment 162 being extended from the base 120 at an extended position 108, by moving away from each other along an extended direction 107 relative to the respective first base segment 124 and the second base segment 126, the opening 115 surrounded by the base 120, the first support member 140 and the second support member 160 is formed of a second dimension D12 which is greater than the first dimension D11, i.e. the second dimensioned opening 115 is for receiving a care receiver's finger of a relatively larger size P12 in cross section.

In the embodiment shown in FIG. 1 to FIG. 8, the wearable physiological measurement apparatus 100 further comprises a bridge member 180 movably coupled to the first holding segment 148 of the first support member 140 and the second holding segment 168 of the second support member 160 such that the base 120, the first support member 140, the second support member 160 and the bridge member 180 form an octagon-shaped closed ring surrounding the opening 115. Movement of the first support member 140 and the second support member 160 relative to the base 120 also causes the bridge member 180 and the first support member 140 and the second support member 160 to move relative to each other, to vary a dimension of the closed ring, as defined by the opening 115, i.e. for accommodating a care receiver's finger of various size. In addition to providing greater structural strength and rigidity, the bridge member 180 may also be configured to house additional components of the apparatus 100, as illustrated in further details hereinafter.

The apparatus 100 may further comprise at least one resilient members coupled between two of the base 120, the first support member 140, the second support member 160 the bridge member 180. In a preferred embodiment, the apparatus 100 further comprise a first pair of resilient members 134 and/or a second pair of resilient members 136. Each of the first pair of resilient members 134 is coupled between the first support member 140 and the base 120 and the bridge member 180, respectively. Each of the second pair of resilient members 136 is coupled between the second support member 160 and the base 120 and the bridge member 180, respectively. Each of the first and second pair of resilient members 134, 136 may be a helical tension spring, made of elastically deformable material such as metal, and capable of elastic deformation under an external tension force toward an extended length, and resume toward the original length after the external tension force is released. Due to the elasticity characteristics, the first and second pairs of resilient members 134, 136 bias the respective first support member 140 and second support member 160 toward the base 120 and the bridge member 180, respectively.

Structured in the above-illustrated manner, and due to the elasticity characteristics of the first and second pairs of resilient members 134 and 136, the closed ring formed by the base 120, the first support member 140, the second support member 160 and the bridge member 180 has a tendency to maintain the opening 115 at a minimum dimension.

In cases where the apparatus 100 is to be used by a first care receiver of a relatively skinny figure, the first and second support members 140 and 160 can be pulled slightly away from the base 120 and the bridge member 180, by overcoming the elastic force of the first and second pairs of resilient members 134, 136, to form the opening 115 with a size slightly greater than the finger of the first care receiver. Once the finger of the first care receiver is placed in the opening 115, the first and second support members 140 and 160 are released and biased by the first and second pairs of resilient members 134, 136, the first and second support members 140 and 160 moves towards the base 120 and the bridge member 180, to grip the finger of the first care receiver in the opening 115, such that vital signs measurement can be carried out by the apparatus 100 through the finger In cases where apparatus 100 is to be used for another care receiver of a relatively burly figure, the first and second support members 140 and 160 can be pulled to extend further away from the base 120 and the bridge member 180, by overcoming the elastic force of each of the first and second resilient members 134, 136 such that the opening 115 is sufficiently large for receiving the finger of the another care receiver. Once the finger is placed in the opening 115, the first and second support members 140 and 160 are released. Acted by the elastic force of each of the first and second pairs of resilient members 134, 136, the first support member 140 and the second support member 160 are retracted back toward the base 120 and the bridge member 180, to grip the finger in the opening 115, such that vital signs measurement can be carried out by the apparatus 100 through the finger.

The structure and dimension of the base 120, the first and the second support members 140, 160 and the bridge member 180 are configured according to the actual size of the fingers of human beings with various body figures, such that the apparatus 100 is suitable for various groups of care receivers to perform measurement with same level of accuracy and user comfortability.

Once the finger of a care receiver is placed in the opening 115 and griped by the base 120, the first and the second support members 140, 160 and the bridge member 180, the probe 194 is brought into contact with the finger, to transmit and receive optical and electrical signals to and from the finger, for measurement of the degree of oxygen saturation of circulating blood or a localized region of the care receiver.

The measurement device 190 may be movably coupled to the middle portion 122 of the base 120, and the apparatus 100 may further include a compression resilient member 198, e.g. a compression spring disposed between the base 120 and the measurement device 190 to bias the measurement device 190 toward the opening 115. When a care receiver's finger is placed in the opening 115 and griped within the opening 115 by the base 120, first and second support members 140, 160 and the bridge member 180, the probe 194 is further biased by the compression resilient member 198 against the finger, to improve the contactability and comfortability of a care receiver's finger during measurement. The base 120, the first and second support members 140, 160 and the bridge member 180 may be made of rigid materials such as metal, carbon fiber, hard plastic or the like, and with the capabilities of relative movements between the base 120, the first and second support members 140, 160 and the bridge member 180 to vary the dimension of the opening 115. Alternatively of additionally, one or all of the base 120, the first and second support members 140, 160 and the bridge member 180 may include portions or segments made by resilient material, such as silicon rubber or soft plastic, such that in use, in addition to the capabilities of relative movements between the base 120, the first and second support members 140, 160 and the bridge member 180 that varies the dimension of the opening 115, the resilient portions or segments of one or more of the base 120, the first and second support members 140, 160 and the bridge member 180 may also provide additional capabilities better adapt and/or supplement the movements of between the base 120, the first and second support members 140, 160 and the bridge member 180, to vary or find tune the dimension and/shape of the opening 115, to provide improved measurement results and user comfortabilities.

As shown in FIG. 7 to FIG. 11, the apparatus 100 may further include an electrical connector 182 disposed in the bridge member 180. The first battery 145 is disposed in the first support member 140 and electrically connected to the measurement device 190 for supplying electrical power to the measurement device 190. The first battery 145 and the second battery 165 may be of the type of rechargeable battery, and the electrical connector 182 is electrically connected to the first battery 145 and second battery 165 for charging the first battery 145 and the second battery 165. The electrical connector 182 has a connection interface 183, e.g. a receptacle, facing the opening 115 and accessible from the opening 115. Connection interface 183 is configured to be connectable to an external power adaptor for charging the first and second batteries 140, 160. Additionally, the connection interface 183 may also be configured as a signal interface and connectable with an external controller or processor, for accessing the data stored in the measurement device 190.

Referring again to FIG. 4, the first battery 145 and the second battery 165 are positioned with the respective power output terminals 145a, 165a positioned closer to, and electrically connected to the measurement device 190. The apparatus 100 includes a first electrical cable 184 and a second electrical cable 186. The first electrical cable 184 is arranged to pass through the first pairs of resilient members 134 and the first support member 140, and electrically connected to the electrical connector 182 and the first battery 145. The second electrical cable 186 is arranged to pass through the second pair of resilient members 136 and the second support member 160, and electrically connected to the electrical connector 182 and the second battery 165.

Figure 8:
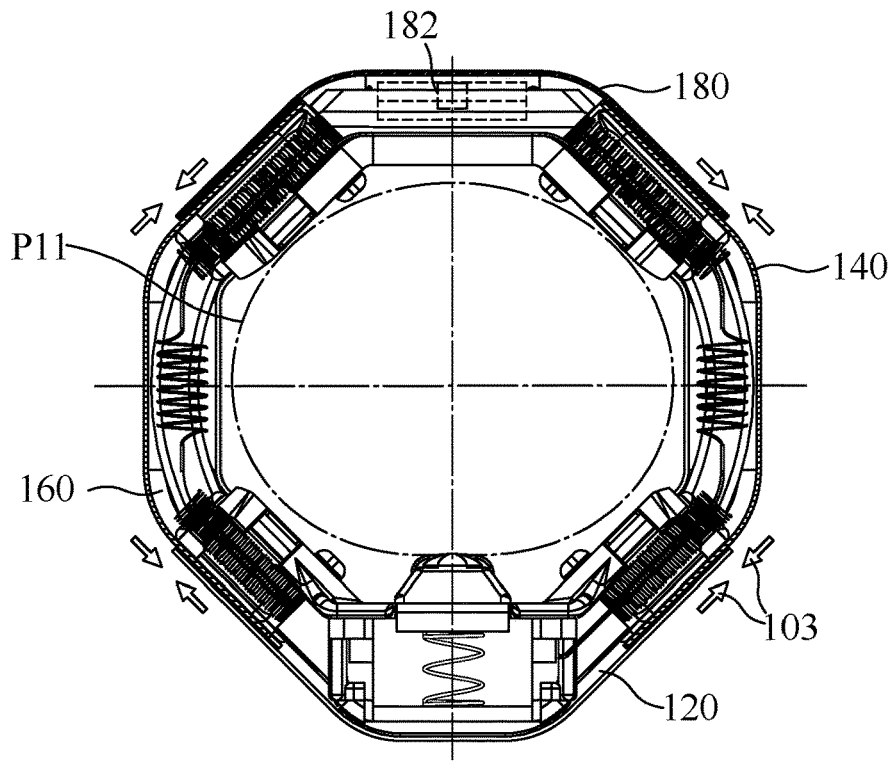
FIG. 8 is a partial cross sectional view of FIG. 6.

As shown in FIG. 8, the first electrical cable 184 and the second electrical cable 186 each has a respective first end 184a, 186a, a respective second end 184e, 186e and a convoluted segment 184c, 186c formed between the respective first end 184a, 186a and the second end 184e, 186e. The first end 184a, 186a are each connected to the power terminals of the respective first and second battery 145, 165. The second end 184e, 186e are each connected to the electrical connector 182.

The convoluted segments 184c, 186c are each disposed in the first support member 140 and the second support member 160, respectively. Each of the convoluted segments 184c, 186c may be formed by winding the respective first and second electrical cable 184, 186 into a helix coil portion suitable for being received in the respective first support member 140 and the second support member 160.

In use, upon being pulled with an external force, the first support member 140 and the second support member 160 move away from the base 140 and the bridge member 180 to enlarge the dimension of the opening 115, for receiving a care receiver's finger in the opening. After the external force is released, the first support member 140 and the second support member 160 move towards the base 140 and the bridge member 180 to reduce the dimension of the opening 115, for accommodating the gripping the care receiver's finger in the opening 115. Following the movement of the first support member 140 and the second support member 160 relative to the base 120 and the bridge member 180, each of the convoluted segments 184c, 186c is stretched or compressed, so as to maintain the connection of the of the first and second electrical cable 184, 186 with the power terminals of the first and second battery 145, 165 and electrical connector 182.

Each of the first and second pair of resilient members 134, 136 may be a helical spring, with a pair of diameter-reduced neck portions 134a, 136a, formed close to the ends thereof, respectively. The base 120 and the bridge member 180 each comprises a pair of first notches 121, 181 into which a first one of the neck portions 134a, 136a of a respective resilient member 134, 136 is fit and retained.

Figure 4:
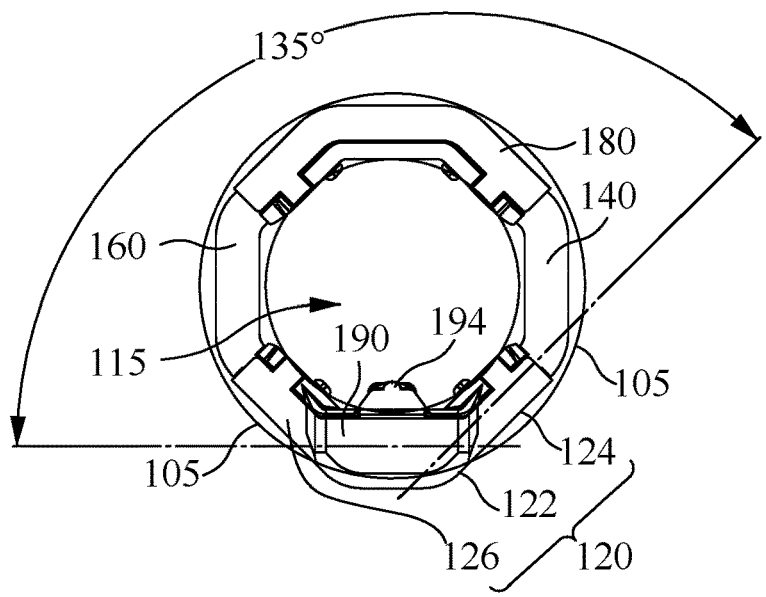
FIG. 4 is a front view of FIG. 1.
Figure 5:
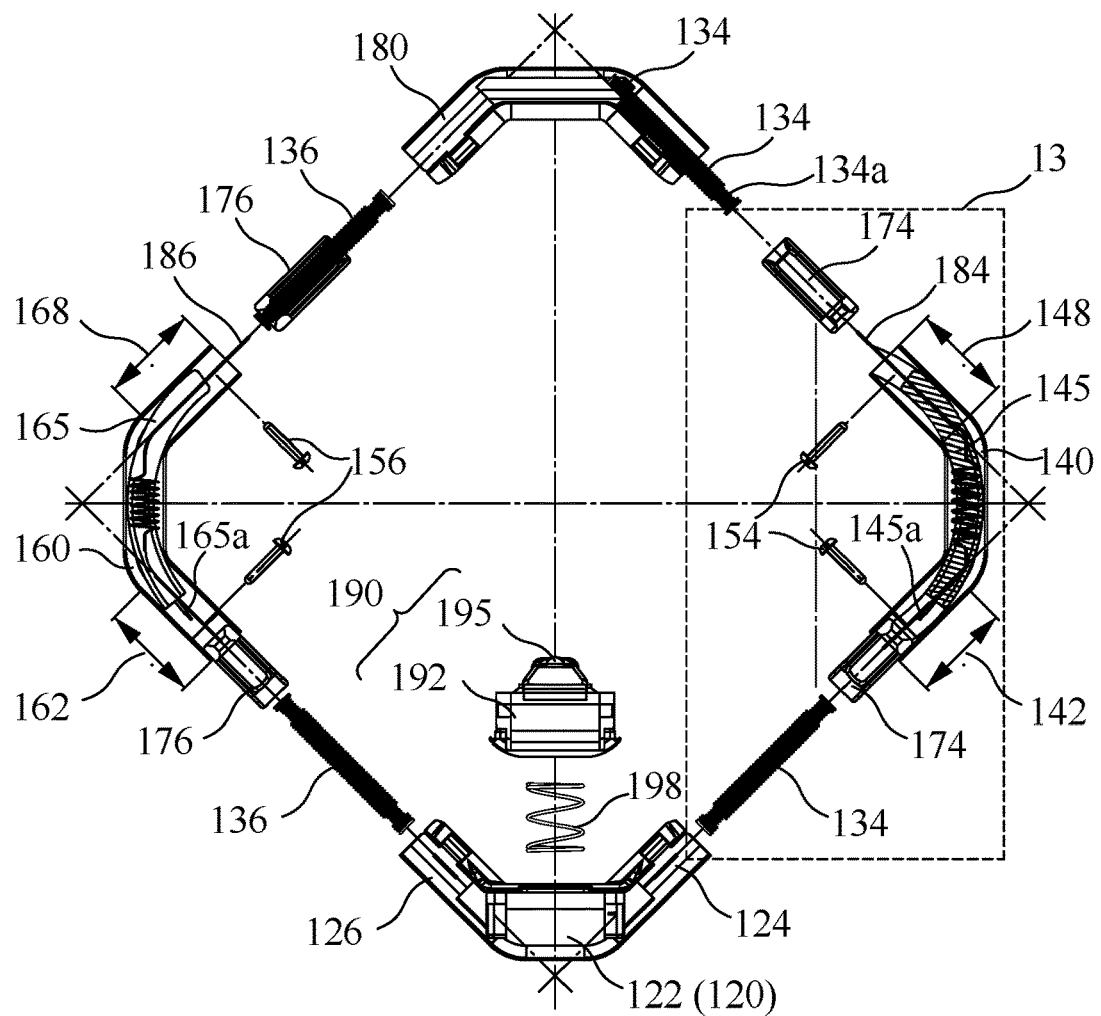
FIG. 5 is an exploded front view of FIG. 4.
Figure 6:
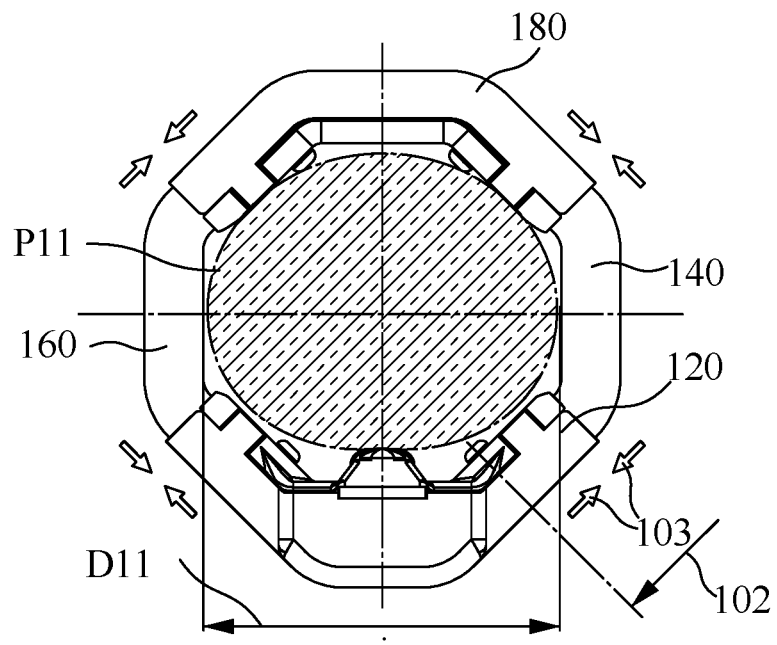
FIG. 6 is a front view showing one use status of the apparatus of FIG. 1.
Figure 7:
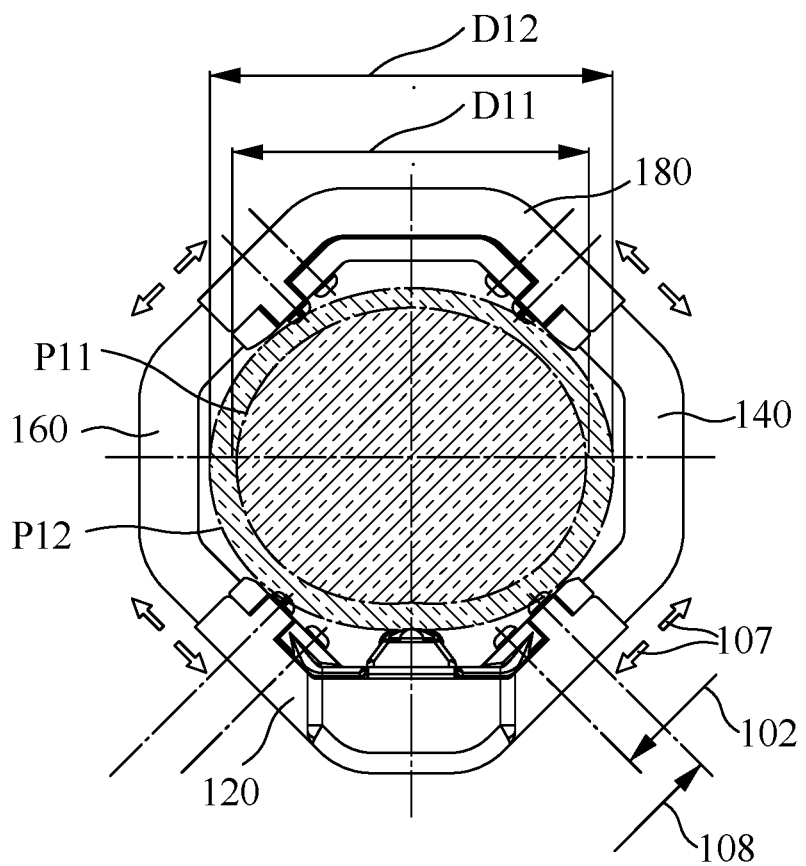
FIG. 7 is a front view showing another use status of the apparatus of FIG. 1.
Figure 9:
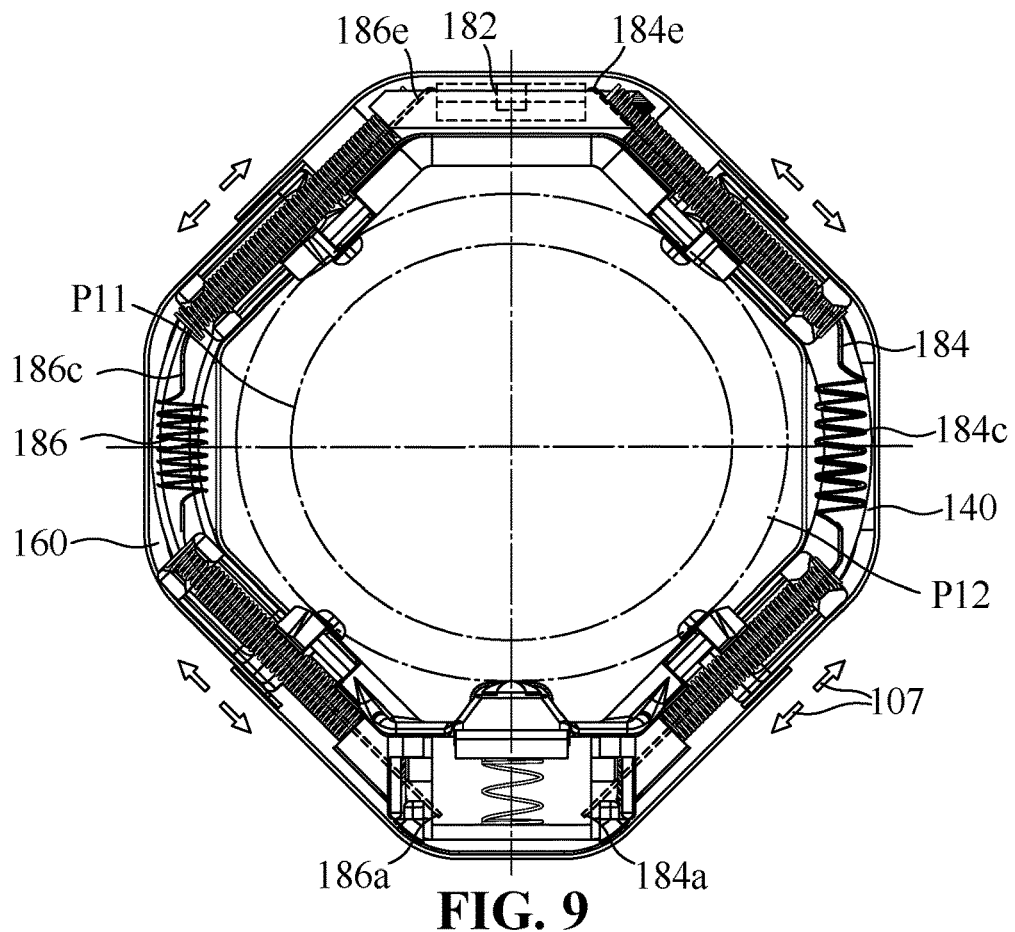
FIG. 9 is a partial cross sectional view of FIG. 7.
Figure 10:
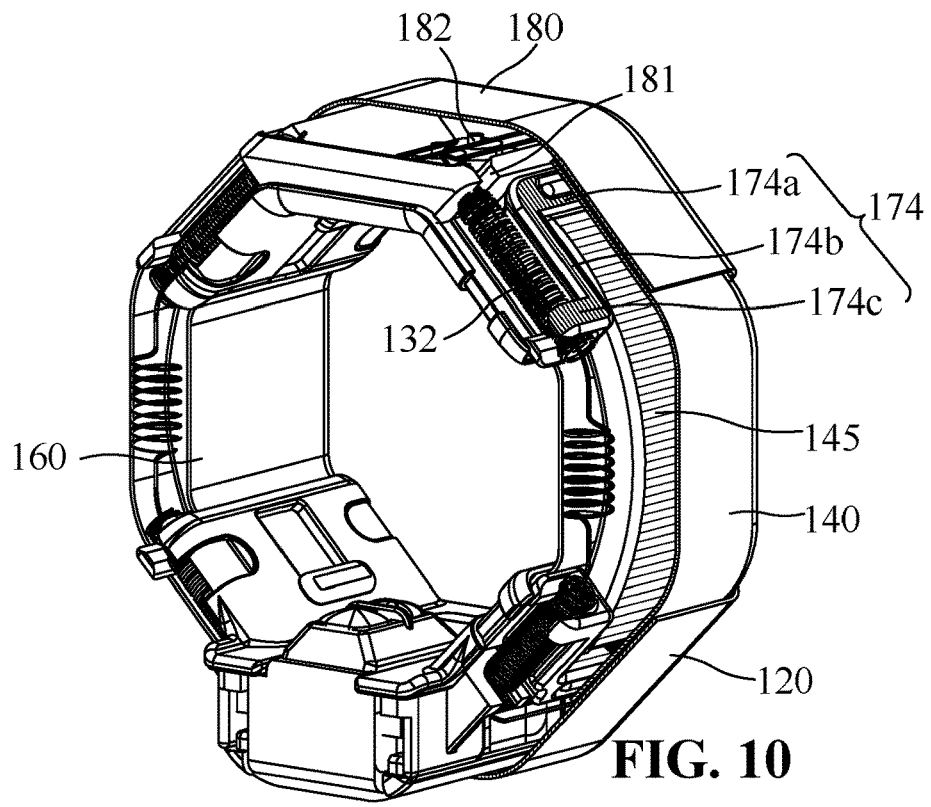
FIG. 10 is a perspective top-front view of FIG. 8.
Figure 11:
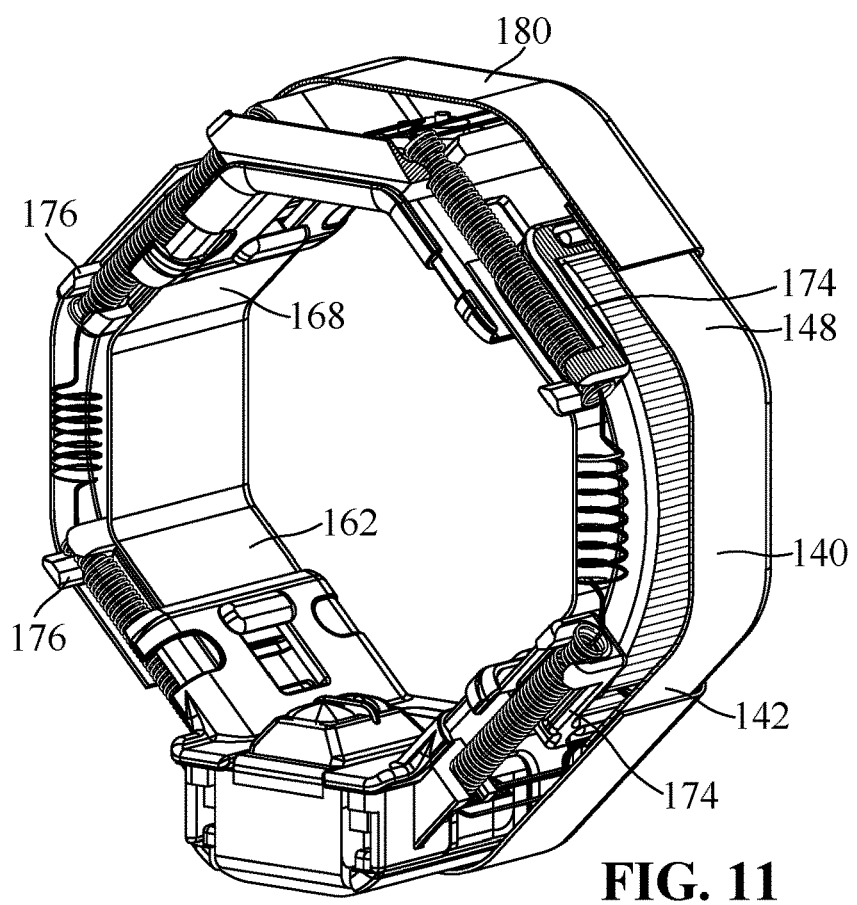
FIG. 11 is a perspective top-front view of FIG. 9.

As shown in FIG. 4, FIG. 9 and FIG. 10, the apparatus 100 further comprises a first pair of brackets 174 and a second pair of brackets 176. Each one of the first pair of brackets 174 is received in a respective one of the first mounting segment 142 and the first holding segment 148 of the first support member 140, and each one of the second pair of brackets 176 is received in a respective one of the second mounting segment 162 and the second holding segment 168 of the second holding member 160.

Each one of the first and second pair of brackets 174, 176 has a stopper, an arm extending perpendicularly from the stopper, and a fork formed at a distal end of the arm. The first and second pairs of brackets have the same and respective symmetrical structure and positional and functional relationship with the adjacent components and for the purpose conciseness of the context. In the context, one of the first pair of brackets 174 disposed between the first support member 140 and the bridge member 180 is taken as an example for illustration.

The bracket 174 has a stopper 174*a*, an arm 174*b* extending perpendicularly from the stopper 174*a*, and a fork 174*c* formed at a distal end of the arm 174*b*. The first pair of brackets 174 is disposed between the first support member 140 and the base 120 and the bridge member 180, respectively, and positioned with the stopper 174*a* abutting against a respective end of the first battery 145 disposed in the first support member 140. The arm 174*b* extends further into the first support member 140, and with the fork 174*c* positioned in the first support member 140 such that a distance between the fork 174*c* and a respective notch 181 of the bridge member 180 is configured to accommodate and provide a space according to the length-variation characteristics of the first resilient member 134. One of the first pair of the first resilient member 134 is disposed between the bridge member 180 and the first support member 140, with the neck portion 134*a* caught by one of the notches 181 of the bridge member 180, and with the other neck portion 134*c* caught by the fork 174*c* of one of the first bracket 174.

Likewise, the other one of the first pair of resilient members 134 is disposed between the base 120 and the second support member 140, one of the second pair of resilient members 136 is disposed between the second support member 160 and the base 120, and the other one of the second pair of resilient members 136 is disposed between the second support member 160 and the bridge member 180.

The apparatus 100 further includes a first pair of locking pins 154 and a second pair of locking pins 156. One of the first pair of locking pins 154 is disposed through the first mounting segment 142 and a corresponding one of the first pair of brackets 174, to secure the first bracket 174 to the first support member 140. The other one of the first pair of locking pins 154 is disposed through the first holding segment 148 and the other one of the first pair of brackets 176, to secure the bracket 174 to the first support member 140, and with the first battery 145 disposed and retained in the first support member 140 between the first pair of brackets 174. Likewise, the second pair of locking pins 156 are each disposed through the respective second holding segment 162, the second mounting segment 168 and the second pair of brackets 176, to secure the second pair of brackets 176 to the second support member 160 and with the second battery 165 disposed and retained in the second support member 160 between the second pair of brackets 176.

Figure 12:
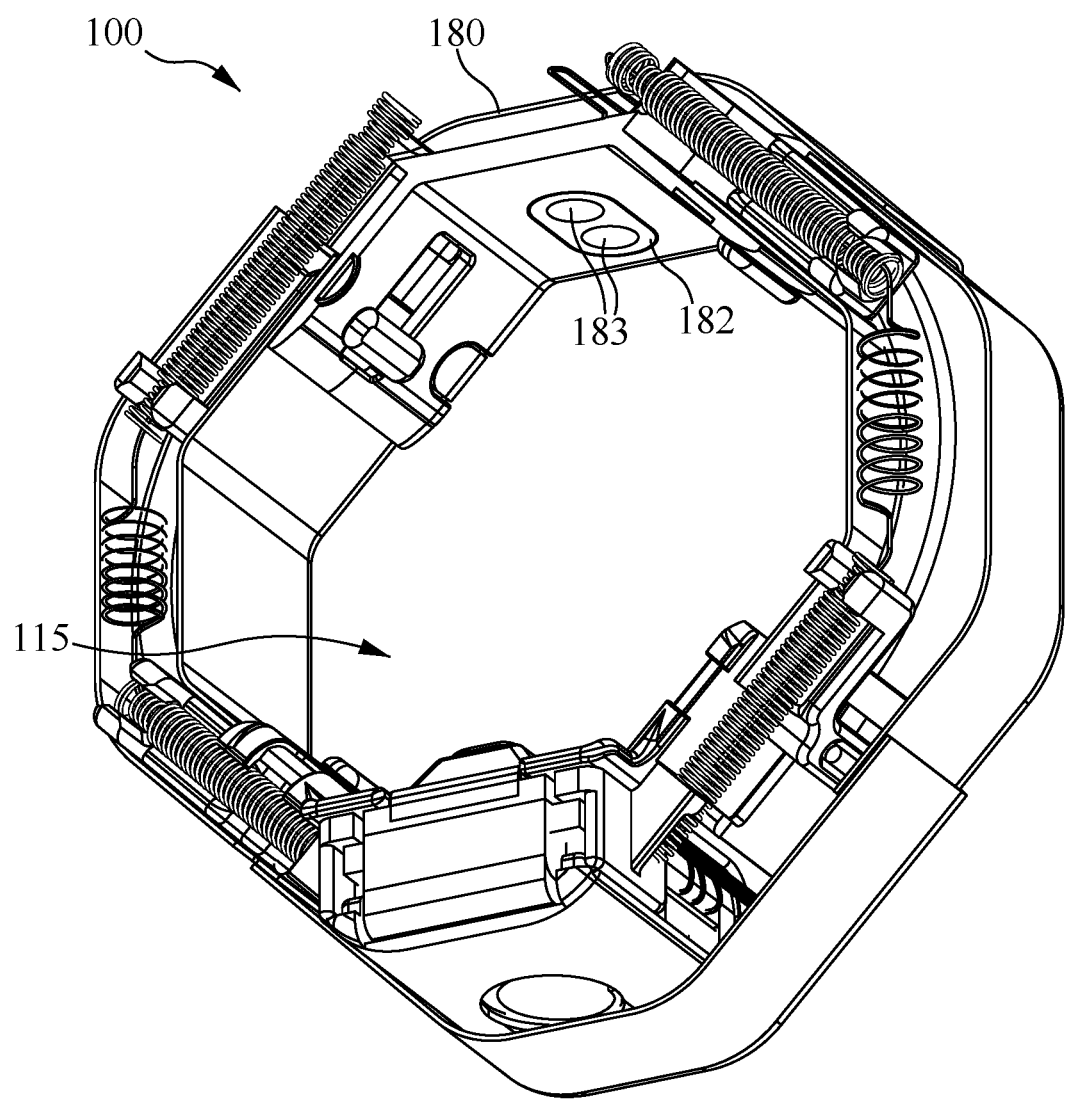
FIG. 12 is perspective bottom-front view of FIG. 9.

As shown further in FIG. 12, the base 120 and the bridge member 180 each comprises on an inner side thereof a respective first and second pair of base slots 123, 183, through which, a respective one of the first and second pairs of locking pins 154, 156 passes. Each one of the first and second pairs of slots 123, 183 has an end edge 123*a*, 183*a* for abutting against a respective locking pins 154, 156, to prevent detachment of the first and the second support member 140, 160 from the base 120 and from the bridge member 180. When the first support member 140 and the second support member 160 move relative to the base 120 and the bridge member 180, with the first mounting segment 142 and the second mounting segment 162 extending away from the base 120 and with the first holding segment 148 and the second holding segment 168 extending away from the bridge member 180, the first and second pairs of locking pins 154, 156 slide in the respective first and second pair of base slots 123, 183, toward the respective end edges 123*a*, 183*a*. Upon the locking pins 154, 156 being brought into contact with the respective end edges 123*a*, 183*a*, the end edges 123*a*, 183*a* abut against the respective locking pins 154, 156 to block further movement of the first support member 140 away from the base 120 and the bridge member 180, hence detachment of the first support member 140 and the second support member 160 from the base 120 and the bridge member 180 is prevented.

Figure 13:
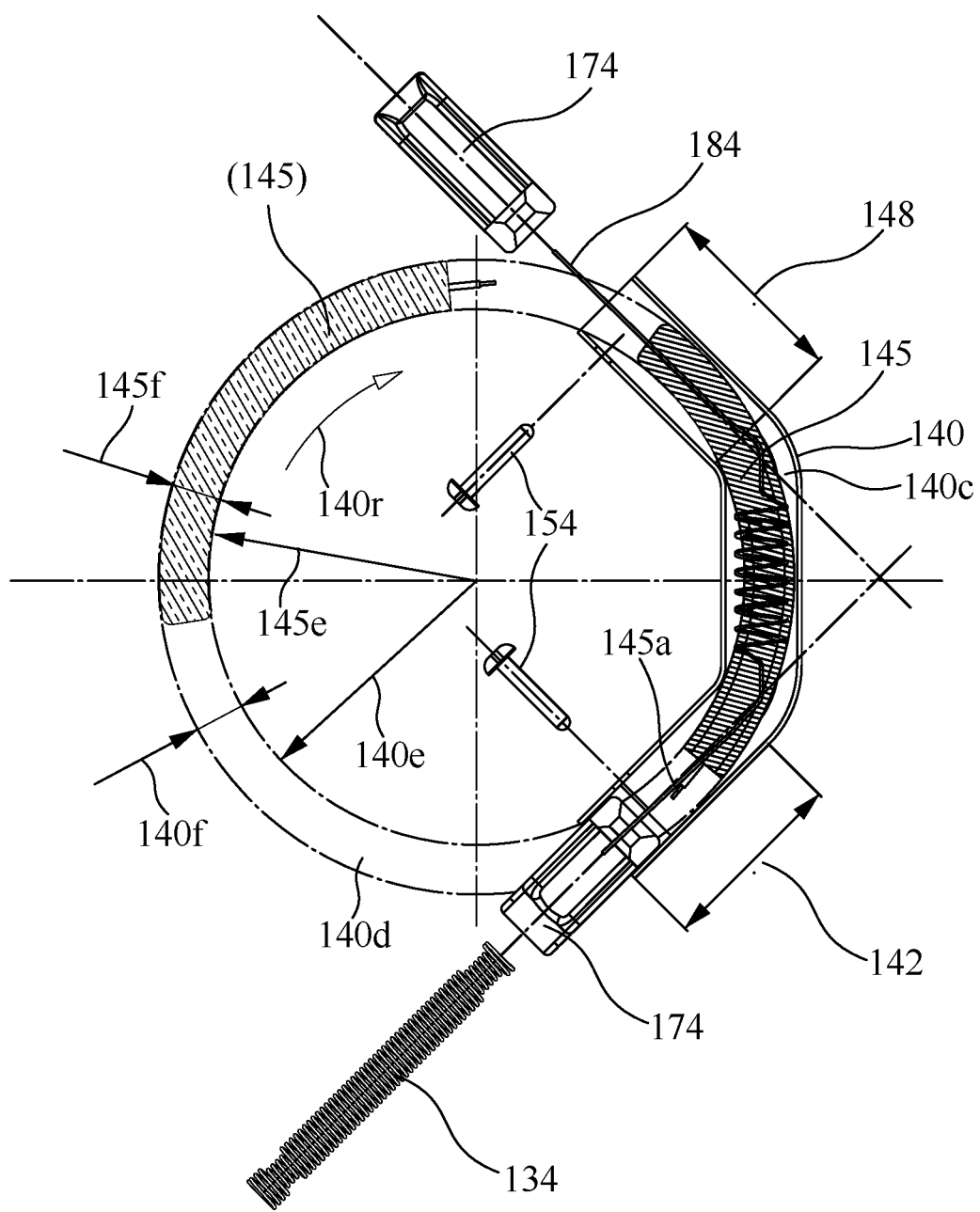
FIG. 13 is a partial enlarged view of portion 13 of FIG. 4 showing assembly process of a battery to the first support member.

The first support member 140 and the second support member 160 each has a cavity formed therein. Taking the first support member 140 as an example, as shown in FIG. 13, the cavity 140*c* is structured to fall into a circular contour 140*d* having a cavity curvature 140*e* and a cavity width 140*f*. The first battery 145 is formed of an elongated and arced main body having a battery curvature 145*e* the same as the cavity curvature 140*e*, and a battery width 145*f* less than or the same as the cavity width 140*f*. The first battery 145 is fitted and assembled to the first support member 140, by sliding into the first support member 140 along a circular direction 140*r* of the circular contour 140*d*. Constructed in the above-illustrated manner, manufacture of the relevant parts e.g. first and second support members 140, 160 and the first and second batteries 145, 164 can be simplified, and the assembling process can be more efficient.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one skilled in the art without departing from the scope or spirit of the disclosure.

The invention claimed is:

1. A wearable physiological measurement apparatus, comprising:
    a base having a first base segment, a second base segment angled relative to the first base segment, and a middle portion between the first base segment and the second base segment;
    a first support member having a first mounting segment and a first holding segment angled with respect to the first mounting segment, the first mounting segment being telescopically coupled to the first base segment of the base;
    a second support member having a second mounting segment and a second holding segment angled with respect to the second mounting segment, the second mounting segment being telescopically coupled to the second base segment of the base;
    the base, the first support member and the second support member being arranged along an annular contour to surround an opening, the first holding segment being angled relative to the first mounting segment toward the opening, and the second holding segment being angled relative to the second mounting segment toward the opening;

a measurement device coupled to the middle portion of the base and projecting towards the opening, a first battery disposed in the first support member and electrically connected to the measurement device;

wherein the first support member and the second support member are movable relative to the base to vary a dimension of the opening.

2. The apparatus as recited in claim 1, further comprising a second battery disposed in the second support member and electrically connected to the measurement device, and a bridge member movably coupled to the first support member and the second support member, wherein the base, the first support member, the second support member and the bridge member form a closed octagon ring surrounding the opening.

3. The apparatus as recited in claim 2, wherein the first support member and the second support member are movable relative to the base and the bridge member between a first position at which the opening is formed of a first dimension and a second position at which the opening is formed of a second dimension greater than the first dimension.

4. The apparatus as recited in claim 3, further comprising:
a first pair of resilient members coupling the first support member to the base and to the bridge member;
a second pair of resilient members coupling the second support member to the base and the bridge member;
wherein the first and second pairs of resilient members bias the respective first and second support members toward the base and the bridge member.

5. The apparatus as recited in claim 4, further comprising an electrical connector disposed in the bridge member, and electrically connected to the first battery and the second battery.

6. The apparatus as recited in claim 5, wherein the electrical connector comprises a connection interface accessible from the opening.

7. The apparatus as recited in claim 5, further comprising a first electrical cable and a second electrical cable, the first electrical cable being arranged to pass through the first pair of resilient members and the first support member, and electrically connected between the electrical connector and the first battery the second electrical cable being arranged to pass through the second pair of resilient members and the second support member and electrically connected between the electrical connector and the second battery.

8. The apparatus of claim 7, wherein the electrical connector is electrically connected to the measurement device through one of the first electrical cable and the second electrical cable.

9. The apparatus as recited in claim 7, wherein the first and second electrical cable each has a convoluted segment disposed in the respective first and second support member, wherein a length of the convoluted segment is variable following movement of the respective first and second support member relative to the base and the bridge member to maintain an electrical connection between the electrical connector and the respective first and second battery.

10. The apparatus as recited in claim 3, wherein the first and the second pair of resilient members are each a helical spring having a neck portion formed at each end thereof, wherein the base and the bridge member each comprises a pair of first notches into which a first one of the neck portions of a respective resilient member is fit and clamped and to exert a tension force to each respective one of the first, the second, the third and the fourth resilient members.

11. The apparatus as recited in claim 10, further comprising a first pair of brackets and a second pair of brackets, each one of the first pair of brackets being received in a respective one of the first mounting segment and the first holding segment of the first support member, each one of the second pair of brackets being received a respective one of the second mounting segment and the second holding segment of the second support member, wherein each one of the first and second pair of brackets has a stopper abutting against one end of the respective first and second batteries, an arm extending from the stopper into the respective first and second support member, and a fork formed at a distal end of the arm to catch a second one of the neck portions of a respective first and second pair of resilient members thereto.

12. The apparatus as recited in claim 11, further comprising a first pair of locking pins and a second pair of locking pins,
wherein each of the first pair of locking pins is disposed to pass through the first mounting segment, the first holding segment and the respective one of the first pair of brackets to secure the first pair of brackets to the first support member, and
wherein each of the second pair of locking pins is disposed to pass through the second mounting segment, the second holding segment and the respective one of the second pair of brackets to secure the second pair of brackets to the second support member.

13. The apparatus as recited in claim 12, wherein the base and the bridge member each comprises on an inner side thereof a pair of base slots and bridge slots through which a respective one of the first and second pairs of locking pins passes, wherein each one of the first and second pairs of base slots and bridge slots has an end edge for abutting against a respective locking pin to prevent detachment of the first and the second support member from the base and from the bridge member.

14. The apparatus as recited in claim 12, wherein the first pair of locking pins and the second pair of locking pins are detachably mounted to the respective first and second support members to allow the respective first and second pair of brackets to be received into and removed from the respective first and second support members.

15. The apparatus as recited in claim 2, wherein at least one of the base, the first and second support members and the bridge member further comprises a portion made by resilient material to vary a shape of the opening.

16. The apparatus as recited in claim 1, wherein the measurement device is movably coupled to the middle portion of the base, the apparatus further comprising a compression resilient member disposed between the base and the measurement device to bias the measurement device toward the opening.

17. The apparatus as recited in claim 1, wherein the first support member and the second support member each has a cavity formed therein, the cavity is structured to fall into a circular contour having a cavity curvature and a cavity width, wherein the first and second battery are each formed of an elongated and arced main body having a battery curvature the same as the cavity curvature and a battery width less than or the same as the cavity width, wherein the first battery and second battery are each disposed in the respective first support member and the second support member by sliding into the respective first support member and the second support member along a circular direction of the cavity contour.

\* \* \* \* \*